United States Patent

Wang (10) Patent No.: US 9,698,909 B2
(45) Date of Patent: Jul. 4, 2017

(54) TRAINING SEQUENCE GENERATION METHOD, TRAINING SEQUENCE GENERATION APPARATUS, AND OPTICAL COMMUNICATIONS SYSTEM

(71) Applicant: Huawei Technologies Co., Ltd., Shenzhen (CN)

(72) Inventor: Ke Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 14/633,610

(22) Filed: Feb. 27, 2015

(65) Prior Publication Data

US 2015/0180577 A1   Jun. 25, 2015

Related U.S. Application Data

(63) Continuation of application No. PCT/CN2012/080821, filed on Aug. 31, 2012.

(51) Int. Cl.
 *H04B 10/27* (2013.01)
 *H04L 7/00* (2006.01)
 (Continued)

(52) U.S. Cl.
 CPC ......... *H04B 10/27* (2013.01); *H04B 10/0779* (2013.01); *H04B 10/548* (2013.01);
 (Continued)

(58) Field of Classification Search
 CPC .... H04B 10/27; H04B 10/548; H04B 10/572; H04B 10/0779; H04B 2001/6912; H04L 7/0075; H04L 27/2697; H04L 27/2613
 See application file for complete search history.

(56) References Cited

U.S. PATENT DOCUMENTS

| 5,732,113 A | 3/1998 | Schmidl et al. |
| 2009/0219978 A1 | 9/2009 | Mobin et al. |

(Continued)

FOREIGN PATENT DOCUMENTS

| CN | 1469561 A | 1/2004 |
| CN | 101232482 A | 7/2008 |

(Continued)

OTHER PUBLICATIONS

Schmidl, T.M., et al., "Robust Frequency and Timing Synchronization for OFDM," IEEE Transactions on Communications, vol. 45, No. 12, Dec. 1997, pp. 1613-1621.

(Continued)

*Primary Examiner* — Shi K Li
*Assistant Examiner* — Mina Shalaby
(74) *Attorney, Agent, or Firm* — Slater Matsil, LLP (57) ABSTRACT

Embodiments of the present invention provide training sequence generation method which includes generating a pseudo random sequence; obtaining a chirp coefficient of a modulator using a negated chirp coefficient to modulate the pseudo random sequence; constructing a training symbol segment that includes L subcarriers in a frequency domain, transforming the training symbol segment from the frequency domain to a time domain to obtain a training symbol segment in the time domain, and generating a training sequence based on the training symbol segment in the time domain and outputting the training sequence.

12 Claims, 4 Drawing Sheets

(51) Int. Cl.
    *H04L 27/26*     (2006.01)
    *H04B 10/077*     (2013.01)
    *H04B 10/548*     (2013.01)
    *H04B 10/572*     (2013.01)
    *H04B 1/69*     (2011.01)

(52) U.S. Cl.
    CPC ......... *H04B 10/572* (2013.01); *H04L 7/0075* (2013.01); *H04L 27/2613* (2013.01); *H04L 27/2697* (2013.01); *H04B 2001/6912* (2013.01)

(56) References Cited

U.S. PATENT DOCUMENTS

| | | |
|---|---|---|
| 2011/0007627 A1 | 1/2011 | Lee et al. |
| 2011/0096855 A1 | 4/2011 | Youn et al. |
| 2011/0212745 A1 | 9/2011 | Papasakellariou |

FOREIGN PATENT DOCUMENTS

| | | |
|---|---|---|
| CN | 101895500 A | 11/2010 |
| CN | 101958868 A | 1/2011 |
| CN | 101960804 A | 1/2011 |
| CN | 102404071 A | 4/2012 |
| EP | 1662736 A2 | 5/2006 |

OTHER PUBLICATIONS

Shen, H., et al., "Multipath Diversity and Channel Estimation Using Time-Varying Chirps in CDMA Systems With Unknown CSI," IEEE Workshop on Statistical Signal Processing, Sep. 28, 2003-Oct. 1, 2003, pp. 335-338.

TRAINING SEQUENCE GENERATION METHOD, TRAINING SEQUENCE GENERATION APPARATUS, AND OPTICAL COMMUNICATIONS SYSTEM

This application is a continuation of International Application No. PCT/CN2012/080821, filed on Aug. 31, 2012, which is hereby incorporated by reference in its entirety.

TECHNICAL FIELD

Embodiments of the present invention relate to the field of optical communications, and in particular, to a training sequence generation method, a training sequence generation apparatus, and an optical communications system.

BACKGROUND

A metropolitan area network system and an optical access network system are a focus of current research. The metropolitan area network sends user services distributed in different places (a company, an organ of government, a smart residential district, a commercial-residential building, a hotel, a school, and the like) to a backbone layer after integrating, sorting, and converging the user services to a maximum extent, so that network hierarchy becomes very clear and efficiency is greatly improved. A plurality of access technologies are available for a broadband metropolitan area network when an optical fiber is used as a transmission medium. An Ethernet access technology and a passive optical network (PON) technology are currently mainstream technologies.

Generally, the metropolitan area network system and the optical access network system have such features as simple system and low costs. After emergence of the optical fiber with a loss of 20 dB in 1970s, people firstly developed and used the optical fiber in intensity modulation (IM)—direct detection (DD) mode for communication. This mode has such advantages as simplicity, cost-effectiveness, and ease of adjustment. In addition, there is another type of fiber optic communications: coherent optical communications. Compared with the IM-DD, the coherent optical communications can not only modulate amplitude of an optical wave, but also perform frequency shift keying or phase shift keying, such as binary phase shift keying, differential phase shift keying, and continuous phase frequency shift keying.

The coherent optical communications has a plurality of modulation modes, which facilitate a flexible engineering application, but increase system complexity and costs. Compared with the coherent optical communications, main advantages of the IM-DD communication mode are as follows: easy system implementation and low costs for components; it is applicable to the conventional metropolitan area network system and the optical access network system.

In a high-speed transmission system, a solution that combines the IM-DD with an orthogonal frequency division multiplexing (OFDM) technology is adopted. The OFDM technology is a special frequency division multiplexing technology. The OFDM is a type of multi-carrier modulation. According to its main idea, a channel is divided into multiple orthogonal subchannels; high-speed data signals are converted into multiple parallel low-speed subdata signals, and each low-speed subdata signal is modulated for transmission on a subchannel. In a frequency domain, these low-speed subdata signals are orthogonal to each other after being modulated to each subchannel, and the signals modulated to each subchannel are restored at a receive end by using a demultiplexing technology.

Figure 1A:
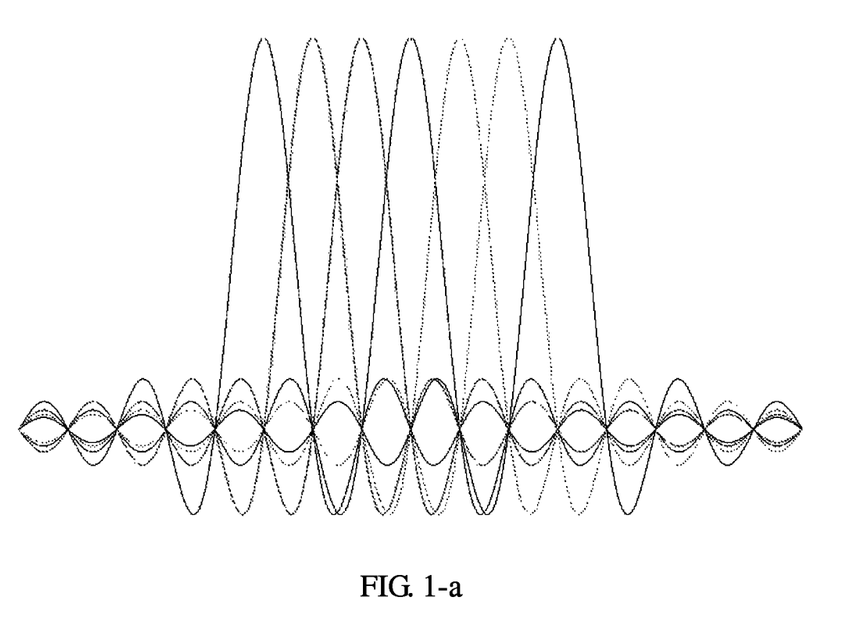

FIG. 1-$a$ is a frequency domain diagram of the OFDM. In FIG. 1-$a$, each individual channel has seven subcarriers, and each subcarrier, represented by a different peak point, meets orthogonality in a whole symbol period. That is, a maximum power point of each subcarrier directly corresponds to a minimum power point of an adjacent subcarrier, so that the subcarriers can partially overlap without interfering with each other, thereby ensuring that the receive end can restore the signal without distortion. The OFDM technology, by overlapping the subcarriers, use a spectrum more efficiently. Although the solution that combines the IM-DD with the OFDM technology has such advantages as improved spectral efficiency and no need for a dispersion compensation fiber in a link, due to a limit on system costs, a distributed feedback laser (DFL), a direct modulation laser, or an electro-absorption modulated laser (EML) is often adopted in the system as an optical signal modulator; when these optical signal modulators perform an amplitude modulation, an accompanying phase modulation is inevitable, and an output optical signal has a phase shift as time changes. This phenomenon is called chirp.

Figure 1B:
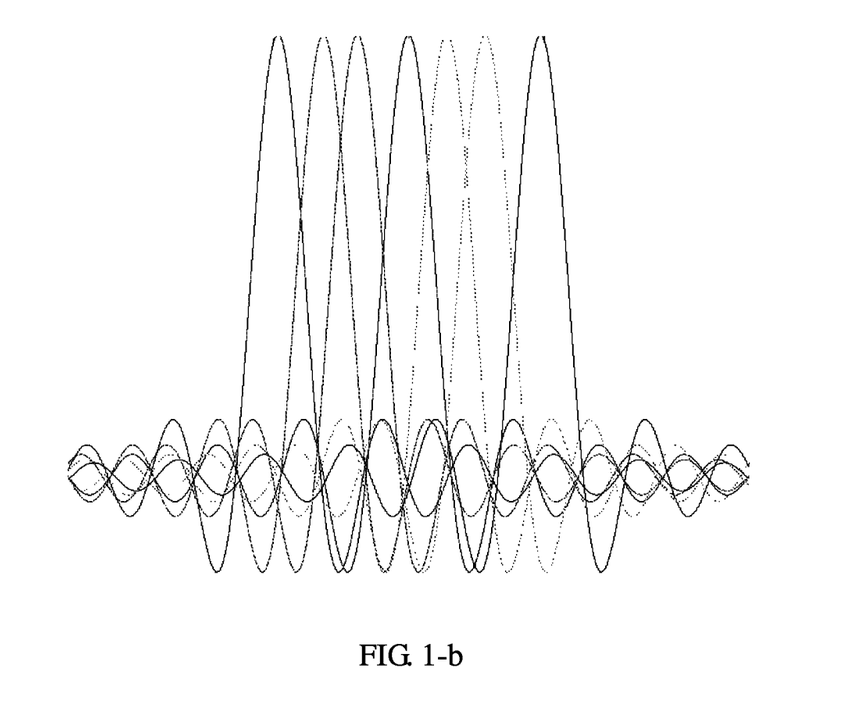

After passing a standard signal-mode fiber, the optical signal with the chirp affects the signal at the receive end, causing a frequency deviation of the optical signal. Higher chirp causes a greater frequency deviation; optical signals with different frequencies have different frequency deviations. FIG. 1-$b$ is a frequency domain diagram of the OFDM after the chirp is introduced at the receive end. It may be seen from FIG. 1-$b$ that due to an introduction of the chirp, orthogonality of the optical signal at the receive end is destroyed, that is, the maximum power point of each subcarrier no longer directly corresponds to the minimum power point of the adjacent subcarrier, thereby causing a severe inter-symbol crosstalk. No related technical solution in the prior art can effectively resolve a problem of the frequency deviation of the optical signal caused by the introduction of the chirp.

SUMMARY

Embodiments of the present invention provide a training sequence generation method, a training sequence generation apparatus, and an optical communications system, to resolve a problem of a frequency deviation of an optical signal caused by an introduction of chirp.

A first aspect of the present invention provides a training sequence generation method applicable to an optical communications system. A pseudo random sequence is generated, where the number of pseudo random numbers in the pseudo random sequence is equal to half the number of subcarriers included in one symbol in the optical communications system. A chirp coefficient of a modulator used in the optical communications system is obtained. A negated chirp coefficient is used to modulate the pseudo random sequence to generate a chirped pseudo random sequence. A training symbol segment that includes L subcarriers in a frequency domain is constructed. The variable L is equal to half the number of subcarriers included in the one symbol in the optical communications system. In the training symbol segment, a signal sent over a subcarrier with an even ordinal number is a frequency domain signal of a pseudo random number with the same ordinal number in the chirped pseudo random sequence, and a signal sent over a subcarrier with an odd ordinal number is a zero-level signal. The training symbol segment is transformed from the frequency domain to a time domain to obtain a training symbol segment in the time domain. A training sequence is generated based on the training symbol segment in the time domain and outputting the training sequence. The time domain of the training sequence structurally includes two same training symbols, and each of the training symbols includes a cyclic prefix and two training symbol segments in the time domain.

With reference to the first aspect of the present invention, in a first possible implementation manner, the negated chirp coefficient is used to modulate the pseudo random sequence to generate a chirped pseudo random sequence is performed as described here. In the time domain, by using the formula $$A(t) = \sqrt{2} A_0 \exp\left[-\frac{1+iC}{2}\left(\frac{t}{T_0}\right)^2\right]$$

an amplitude of the pseudo random number is modulated in the pseudo random sequence to generate the chirped pseudo random sequence, where $0 \le t \le T$, T is a change cycle of the pseudo random number, $A_0$ is the original amplitude of the pseudo random number, $A(t)$ is the amplitude of the pseudo random number at time t after amplitude modulation, i is an imaginary unit, C is the negated chirp coefficient, and $T_0$ is a half-amplitude duration when $A(t)$ is 1/e times the value of $A_0$, where e is a natural base. In the frequency domain, before sending the chirped pseudo random sequence over the subcarrier with the even ordinal number in the training symbol segment and sending the zero-level signal over the subcarrier with the odd ordinal number in the training symbol segment, the method includes transforming the chirped pseudo random sequence from the time domain to the frequency domain.

With reference to the first aspect or the first possible implementation manner of the present invention, in a second possible implementation manner, the obtaining a pseudo random sequence is specifically generating the pseudo random sequence by shifting a shift register.

With reference to the first aspect of the present invention, or the first possible implementation manner of the first aspect of the present invention, or the second possible implementation manner of the first aspect of the present invention, in a third possible implementation manner, the transforming the training symbol segment from the frequency domain to a time domain is specifically transforming the training symbol segment from the frequency domain to the time domain by using an inverse fast Fourier transformation or an inverse discrete Fourier transform.

With reference to the first aspect of the present invention, or the first possible implementation manner of the first aspect of the present invention, or the second possible implementation manner of the first aspect of the present invention, or the third possible implementation manner of the first aspect of the present invention, in a fourth possible implementation manner of the present invention, an amplitude of the signal sent over the subcarrier with the even ordinal number is $\sqrt{2}$ times an amplitude of the frequency domain signal of the pseudo random number with the same ordinal number in the chirped pseudo random sequence.

A second aspect of the present invention provides a training sequence generation apparatus applicable to an optical communications system. A first generating unit is configured to generate a pseudo random sequence, where the number of pseudo random numbers in the pseudo random sequence is equal to half the number of subcarriers included in one symbol in the optical communications system. An obtaining unit is configured to obtain a chirp coefficient of a modulator used in the optical communications system. A second generating unit, configured to use a negated chirp coefficient to modulate the pseudo random sequence to generate a chirped pseudo random sequence. A constructing unit is configured to construct a training symbol segment that includes L subcarriers in a frequency domain, where L is equal to half the number of subcarriers included in the one symbol in the optical communications system, and in the training symbol segment a signal sent over a subcarrier with an even ordinal number is a frequency domain signal of a pseudo random number with the same ordinal number in the chirped pseudo random sequence, and a signal sent over a subcarrier with an odd ordinal number is a zero-level signal. An inverse Fourier transforming unit is configured to transform the training symbol from the frequency domain to a time domain to obtain a training symbol segment in the time domain. A training sequence generating and outputting unit is configured to generate a training sequence based on the training symbol segment in the time domain and output the training sequence, where the time domain of the training sequence structurally includes two same training symbols, and each of the training symbols includes a cyclic prefix and two training symbol segments in the time domain.

With reference to the second aspect of the present invention, in a first possible implementation manner, the second generating unit is specifically configured, in the time domain and by using the formula $$A(t) = \sqrt{2} A_0 \exp\left[-\frac{1+iC}{2}\left(\frac{t}{T_0}\right)^2\right],$$

to modulate an amplitude of the pseudo random number in the pseudo random sequence generated by the first generating unit to generate the chirped pseudo random sequence, where, $0 \le t \le T$, T is a change cycle of the pseudo random number, $A_0$ is the original amplitude of the pseudo random number, $A(t)$ is the amplitude of the amplitude of the pseudo random number at time t after amplitude modulation, i is an imaginary unit, C is the negated chirp coefficient, and $T_0$ is a half-amplitude duration when $A(t)$ is 1/e times the value of $A_0$, where e is a natural base. The training sequence generation apparatus further includes Fourier transforming unit, configured to transform the chirped pseudo random sequence generated by the second generating unit from the time domain to the frequency domain.

With reference to the second aspect or the first possible implementation manner of the second aspect of the present invention, in a second possible implementation manner, the first generating unit is specifically configured to generate the pseudo random sequence by shifting a shift register.

With reference to the second aspect of the present invention, or the first possible implementation manner of the second aspect of the present invention, or the second possible implementation manner of the second aspect of the present invention, in a third possible implementation manner, the inverse Fourier transforming unit is specifically configured to transform the training symbol segment from the frequency domain to the time domain by using an inverse fast Fourier transformation or an inverse discrete Fourier transform.

With reference to the second aspect of the present invention, or the first possible implementation manner of the second aspect of the present invention, or the second possible implementation manner of the second aspect of the present invention, or the third possible implementation manner of the second aspect of the present invention, in a fourth possible implementation manner, the constructing unit is further configured to increase an amplitude of the signal sent over the subcarrier with the even ordinal number to $\sqrt{2}$ times an amplitude of the frequency domain signal of the pseudo random number with the same ordinal number in the chirped pseudo random sequence.

A third aspect of the present invention provides an optical communications system that includes a training sequence generation apparatus, an optical transmitter, and an optical receiver. The training sequence generation apparatus is configured to generate a pseudo random sequence, where the number of pseudo random numbers in the pseudo random sequence is equal to half the number of subcarriers included in one symbol in the optical communications system; obtain a chirp coefficient of a modulator used in the optical communications system; use a negated chirp coefficient to modulate the pseudo random sequence to generate a chirped pseudo random sequence; construct a training symbol segment that includes L subcarriers in a frequency domain, where L is equal to half the number of subcarriers included in the one symbol in the optical communications system, and in the training symbol segment, a signal sent over a subcarrier with an even ordinal number is a frequency domain signal of a pseudo random number with the same ordinal number in the chirped pseudo random sequence, and a signal sent over a subcarrier with an odd ordinal number is a zero-level signal; transform the training symbol segment from the frequency domain to a time domain to obtain a training symbol segment in the time domain; and generate a training sequence based on the training symbol segment in the time domain and output the training sequence, where the time domain of the training sequence structurally includes two training symbols, and each of the training symbols includes a cyclic prefix and two training symbol segments in the time domain.

The optical transmitter is configured to insert the training sequence output by the training sequence generation apparatus before a start position of at least one symbol to be sent, so as to form a symbol frame that carries the training sequence; and send the symbol frame after transmission processing to the optical receiver.

The optical receiver is configured to perform, when receiving the symbol frame, symbol timing synchronization processing and carrier frequency synchronization processing by using the training sequence.

It can be learned from the foregoing technical solution that the embodiments of the present invention have the following advantages.

In the embodiments of the present invention, a training sequence is generated and output by obtaining a chirp coefficient and a pseudo random sequence of an optical signal modulator and using a negated chirp coefficient to modulate the pseudo random sequence. Because a signal sent over a subcarrier with an even ordinal number of a training symbol segment included in the training sequence is generated by using the negated chirp coefficient to modulate the pseudo random sequence, after the training sequence passes the modulator, positive chirp and negative chirp offset each other, so as to effectively resolve a problem of a frequency deviation of an optical signal caused by an introduction of the chirp.

BRIEF DESCRIPTION OF THE DRAWINGS

FIG. 1-$a$ is a frequency domain diagram of an OFDM when chirp is not introduced;

FIG. 1-$b$ is a frequency domain diagram of an OFDM when chirp is introduced;

FIG. 2-$a$ is a schematic flowchart of an embodiment of a training sequence generation method according to an embodiment of the present invention;

FIG. 2-$b$ is a schematic structural diagram of a training symbol in a time domain according to embodiment of the present invention;

DETAILED DESCRIPTION OF ILLUSTRATIVE EMBODIMENTS

Embodiments of the present invention provide a training sequence generation method, a training sequence generation apparatus, and an optical communications system.

Figure 2A:
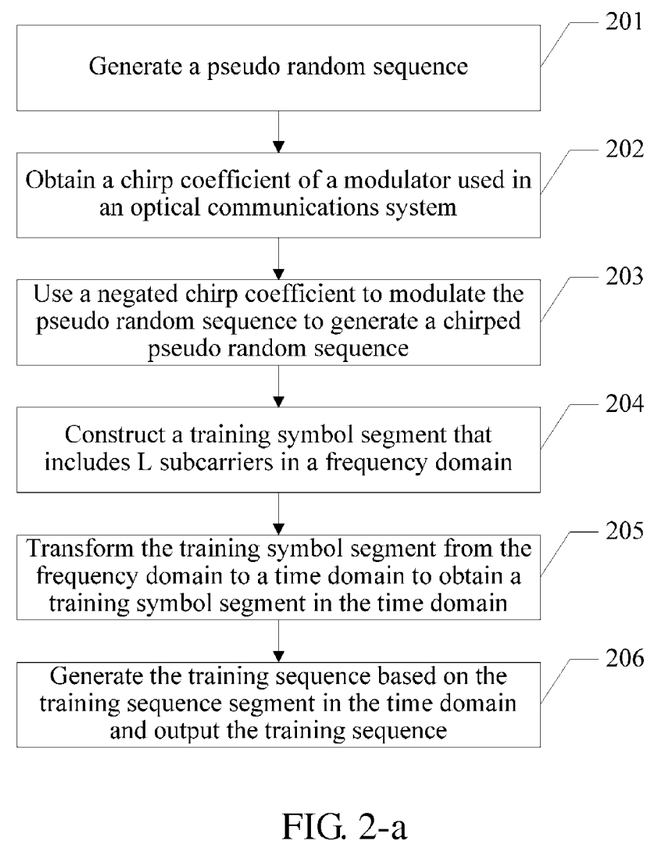

The following describes a training sequence generation method in an embodiment of the present invention. Referring to FIG. 2-$a$, the method includes the following steps.

201: Generate a pseudo random sequence.

In this embodiment of the present invention, the pseudo random sequence is a series of 0s or 1s when it is seen in a time domain, for example, 0010111000011 is a pseudo random sequence including 13 pseudo random numbers. A training sequence generation apparatus may generate the pseudo random sequence by using a shift register. Certainly, the training sequence generation apparatus may also generates the pseudo random sequence in other means, which is not limited herein.

In this embodiment of the present invention, the number of pseudo random numbers in the pseudo random sequence generated by the training sequence generation apparatus is equal to half the number of subcarriers included in one symbol in an optical communications system.

202: Obtain a chirp coefficient of a modulator used in the optical communications system.

The training sequence generation apparatus obtains the chirp coefficient of the modulator that is configured to modulate a transmission signal in the optical communications system.

In an actual application, a chirp coefficient of an EML is small, usually less than or equal to 2; a chirp coefficient of a DFL is large, usually greater than or equal to 6, because there is a certain relationship between a transmission bandwidth of the optical communications system and the chirp coefficient of the modulator used in the optical communications system. For example, the relationship between the chirp coefficient of the EML and the transmission bandwidth of the optical communications system is expressed by the following formula:

$$f_{3dB}^2 = \frac{\tan^{-1}a - \tan^{-1}\sqrt{1+2a^2}}{2\pi^2 \beta_2 L},$$

where α is the chirp coefficient; $\beta_2$ is a dispersion coefficient; and L is a length of an optical fiber.

Therefore, in this embodiment of the present invention, the training sequence generation apparatus may obtain the chirp coefficient of the modulator in the optical communications system according to a relationship between the transmission bandwidth and the chirp coefficient of the modulator in the optical communications system. Certainly, the training sequence generation apparatus in this embodiment of the present invention may also obtain the chirp coefficient of the modulator in the optical communications system in other means, for example, the training sequence generation apparatus may obtain the chirp coefficient of the modulator in the optical communications system according to a relationship between a bias voltage of the modulator in the optical communications system and the chirp coefficient, which is not limited herein.

203: Use a negated chirp coefficient to modulate the pseudo random sequence to generate a chirped pseudo random sequence.

In one application scenario of the present invention, the training sequence generation apparatus uses, in the time domain, the formula $$A(t) = \sqrt{2} A_0 \exp\left[-\frac{1+iC}{2}\left(\frac{t}{T_0}\right)^2\right]$$

to modulate an amplitude of the pseudo random number in the pseudo random sequence obtained in step 201, where, 0≤t≤T, T is a change cycle of the pseudo random number; $A_0$ is an original amplitude of the pseudo random number on which the amplitude modulation is performed; A(t) is the amplitude of the chirped pseudo random sequence at time t; i is an imaginary unit; C is the negated chirp coefficient of the chirp coefficient obtained in step 202; and $T_0$ is a half-amplitude duration when A(t) is equal to 1/e times the value of $A_0$, where e is a natural base.

204: Construct a training symbol segment that includes L subcarriers in a frequency domain. L is equal to half the number of subcarriers included in the one symbol (that is, symbol) in the optical communications system, and in the training symbol segment: a signal sent over a subcarrier with an even ordinal number is a frequency domain signal of a pseudo random number with the same ordinal number in the chirped pseudo random sequence, and a signal sent over a subcarrier with an odd ordinal number is a zero-level signal. For example, assuming that the training symbol segment includes subcarriers with ordinal numbers 2, 4, 6, the frequency domain signal of the pseudo random number with the ordinal number 2 in the chirped pseudo random sequence is sent over the subcarrier with the ordinal number 2, the frequency domain signal of the pseudo random number with the ordinal number 4 in the chirped pseudo random sequence is sent over the subcarrier with the ordinal number 4, and the frequency domain signal of the pseudo random number with the ordinal number 6 of the chirped pseudo random sequence is sent over the subcarrier with the ordinal number 6.

Further, to ensure transmit power of the symbol, an amplitude of the signal sent over the subcarrier with the even ordinal number is increased to $\sqrt{2}$ times of an amplitude of the frequency domain signal of the pseudo random number with the same ordinal number in the chirped pseudo random sequence.

In this embodiment of the present invention, if the chirped pseudo random sequence generated in step 203 is a time domain signal, before step 204, the training sequence generation apparatus firstly transforms, by using a Fourier transformation (for example, which may be a fast Fourier transformation (FFT) or a discrete Fourier transform (DFT)), the chirped pseudo random sequence generated in step 203 from the time domain to the frequency domain to obtain the frequency domain signal of the chirped pseudo random sequence, so as to construct the training symbol segment in step 204.

205: Transform the training symbol segment from the frequency domain to a time domain to obtain a training symbol segment in the time domain.

In this embodiment of the present invention, the training sequence generation apparatus may, by using an inverse fast Fourier transformation (IFFT) or an inverse discrete Fourier transform (IDFT), transform the training symbol sequence segment obtained in step 204 from the frequency domain to the time domain to obtain the training symbol segment in the time domain.

206: Generate a training sequence based on the training sequence segment in the time domain and output the training sequence.

Figure 2B:
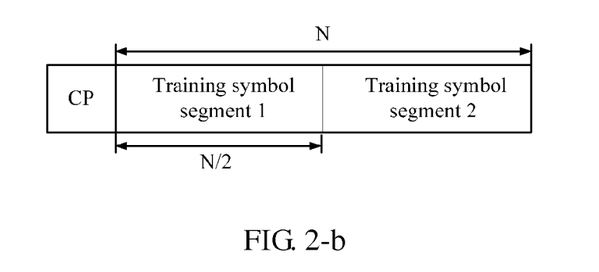

In this embodiment of the present invention, the time domain of the generated training sequence structurally includes two same training symbols. As shown in FIG. 2-b, each training symbol includes a cyclic prefix (CP), a training symbol segment 1, and a training symbol segment 2, where both the training symbol segment 1 and the training symbol segment 2 are the training symbol segments, in the time domain, obtained in step 205. As shown in FIG. 2-b, the training symbol segment 1 and the training symbol segment 2 separately include N/2 subcarriers, where N is the number of the subcarriers included in the one symbol in the optical communications system.

It should be noted that the training sequence generated in this embodiment of the present invention may be applicable to an optical-orthogonal frequency division multiplexing (O-OFDM) system, and may also be applicable to a single-carrier frequency domain equalization system, or may be applicable to other optical communications systems in which chirp is introduced due to the modulator, which is not limited herein.

It may be learned from the foregoing that in this embodiment of the present invention, a training sequence is generated and output by obtaining a chirp coefficient and a pseudo random sequence of an optical signal modulator and using a negated chirp coefficient to modulate the pseudo random sequence. Because a signal sent over a subcarrier with an even ordinal number of a training symbol segment included in the training sequence is generated by using the negated chirp coefficient to modulate the pseudo random sequence, after the training sequence passes the modulator, positive chirp and negative chirp offset each other, so as to effectively resolve a problem of a frequency deviation of an optical signal caused by an introduction of the chirp.

Figure 3:
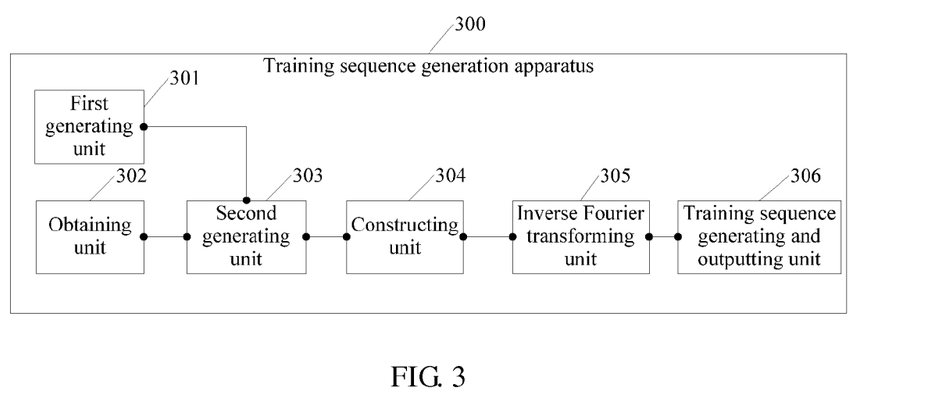
FIG. 3 is a schematic structural diagram of an embodiment of a training sequence generation apparatus according to an embodiment of the present invention.

The following describes a training sequence generation apparatus provided in an embodiment of the present invention. Referring to FIG. 3, a training sequence generation apparatus 300 in this embodiment of the present invention includes a number of units.

A first generating unit 301 is configured to generate a pseudo random sequence.

In this embodiment of the present invention, the pseudo random sequence is a series of 0s or 1s when it is seen in a time domain. The first generating unit 301 may generate the pseudo random sequence by using a shift register. Certainly, the first generating unit 301 may further generates the pseudo random sequence in other means, which is not limited herein.

In this embodiment of the present invention, the number of pseudo random numbers in the pseudo random sequence generated by the first generating unit 301 is equal to half the number of subcarriers included in one symbol in an optical communications system.

An obtaining unit 302 is configured to obtain a chirp coefficient of a modulator used in the optical communications system.

A second generating unit 303 is configured to use a negated chirp to modulate the pseudo random sequence generated by the first generating unit 301 to generate a chirped pseudo random sequence.

In one application scenario of the present invention, the second generating unit 303 is specifically configured to use, in the time domain, the formula $$A(t) = \sqrt{2} A_0 \exp\left[-\frac{1+iC}{2}\left(\frac{t}{T_0}\right)^2\right]$$

to modulate an amplitude of the pseudo random number in the pseudo random sequence generated by the first generating unit 301 to generate a chirped pseudo random sequence, where $0 \leq t \leq T$, T is a change cycle of the pseudo random number; A0 is an original amplitude of the pseudo random numbers on which the amplitude modulation is performed; A(t) is the amplitude of the chirped pseudo random sequence at time t; i is an imaginary unit; C is the negated chirp coefficient of the chirp coefficient obtained by the obtaining unit 302; and $T_0$ is a half-amplitude duration when A(t) is equal to 1/e times the value of $A_0$, where e is a natural base.

A constructing unit 304, configured to construct a training symbol segment that includes L subcarriers in a frequency domain, where L is equal to half the number of subcarriers included in the one symbol in the optical communications system, and in the training symbol segment: a signal sent over a subcarrier with an even ordinal number is a frequency domain signal of a pseudo random number with the same ordinal number in the chirped pseudo random sequence, and a signal sent over a subcarrier with an odd ordinal number is a zero-level signal. Further, to ensure a transmit power of the symbol, the constructing unit 304 increases an amplitude of the signal sent over the subcarrier with the even ordinal number to $\sqrt{2}$ times of an amplitude of the frequency domain signal of the pseudo random number with the same ordinal number in the chirped pseudo random sequence.

In this embodiment of the present invention, if the chirped pseudo random sequence generated by the constructing unit 304 is a time domain signal, the training sequence generation apparatus 300 further includes: a Fourier transforming unit (not shown in the figure), configured to transform, before the constructing unit 304 is triggered, the chirped pseudo random sequence generated by the second generating unit 303 from the time domain to the frequency domain and output the chirped pseudo random sequence to the constructing unit 304.

An inverse Fourier transforming unit 305, configured to transform the training symbol segment constructed by the constructing unit 304 from the frequency domain to the time domain to obtain the training symbol segment in the time domain.

A training sequence generating and outputting unit 306, configured to generate the training sequence based on the training symbol segment in the time domain and output the training sequence after the transformation of the inverse Fourier transforming unit 305, where the time domain of the training sequence generated by the training sequence generating and outputting unit 306 structurally includes two same training symbols, and each of the training symbols includes a cyclic prefix and two training symbol segments in the time domain after the transformation of the inverse Fourier transforming unit 305.

It should be noted that the training sequence generation apparatus 300 in this embodiment of the present invention may be applicable to an O-OFDM system, and may also be applicable to a single-carrier frequency domain equalization system, or may be applicable to other optical communications systems in which chirp is introduced due to the modulator, which is not limited herein.

It should be noted that the training sequence generation apparatus 300 in this embodiment of the present invention may be the training sequence generation apparatus in the foregoing method embodiment, and may be configured to implement all of the technical solutions in the foregoing method embodiment. Functions of each function module may be specifically implemented according to the method described in the foregoing method embodiment. For a specific implementation process, refer to the related descriptions in the foregoing embodiment, and details are not described herein again.

It may be learned from the foregoing that a training sequence generation apparatus in this embodiment of the present invention generates a training sequence, by obtaining a chirp coefficient and a pseudo random sequence of an optical signal modulator and by using a negated chirp coefficient to modulate the pseudo random sequence, and outputs the training sequence. Because a signal sent over a subcarrier with an even ordinal number of a training symbol segment included in the training sequence is generated by using the negated chirp coefficient to modulate the pseudo random sequence, after the training sequence passes the modulator, positive chirp and negative chirp offset each other, so as to effectively resolve a problem of a frequency deviation of an optical signal caused by an introduction of the chirp.

Figure 4:
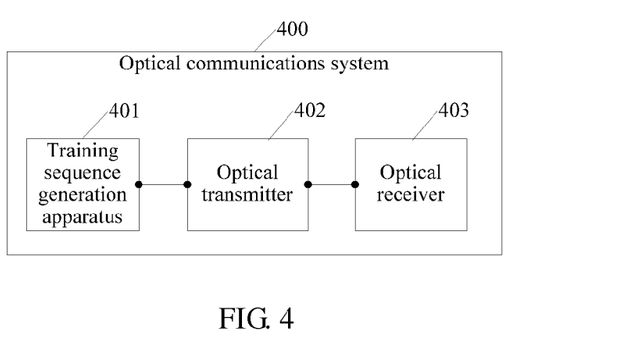
FIG. 4 is a schematic structural diagram of an optical communications system of a training sequence generated by applying the present invention according to an embodiment of the present invention.

An embodiment of the present invention further provides an optical communications system to which a training sequence generated by an embodiment of the present invention is applied. As shown in FIG. 4, an optical communications system 400 includes a training sequence generation apparatus 401, an optical transmitter 402, and an optical receiver 403.

The training sequence generation apparatus 401 in this embodiment of the present invention may be the training sequence generation apparatus in the foregoing apparatus embodiment, and may be configured to implement all of the technical solutions in the foregoing apparatus embodiment. Functions of each function module may be specifically implemented according to the method provided in the foregoing method embodiment. For a specific implementation process, refer to the related descriptions in the foregoing embodiment, and details are not described herein again.

The optical transmitter 402 is configured to insert the training sequence output by the training sequence generation apparatus 401 before a start position of at least one symbol to be sent, so as to form a symbol frame that carries the training sequence, and send the symbol frame after transmission processing to the optical receiver 403. In this embodiment of the present invention, the optical transmitter 402 may insert the training sequence before the start position of each symbol to be sent, and may further insert the training sequence in every few symbols to be sent. A specific inserting manner may be designed according to actual requirements of the optical communications system, which is not limited herein.

The optical receiver 403 is configured to perform, when receiving the symbol frame transmitted from the optical transmitter 402, symbol timing synchronization processing and carrier frequency synchronization processing by using the training sequence in the symbol.

In this embodiment of the present invention, the optical receiver 403, when receiving the symbol frame transmitted from the optical transmitter 402, may use such symbol timing synchronization methods as the Schmidl & Cox (that is, S&C) algorithm or a sliding window method to perform symbol timing synchronization processing and carrier frequency synchronization processing by using the training sequence in the symbol.

Figure 5:
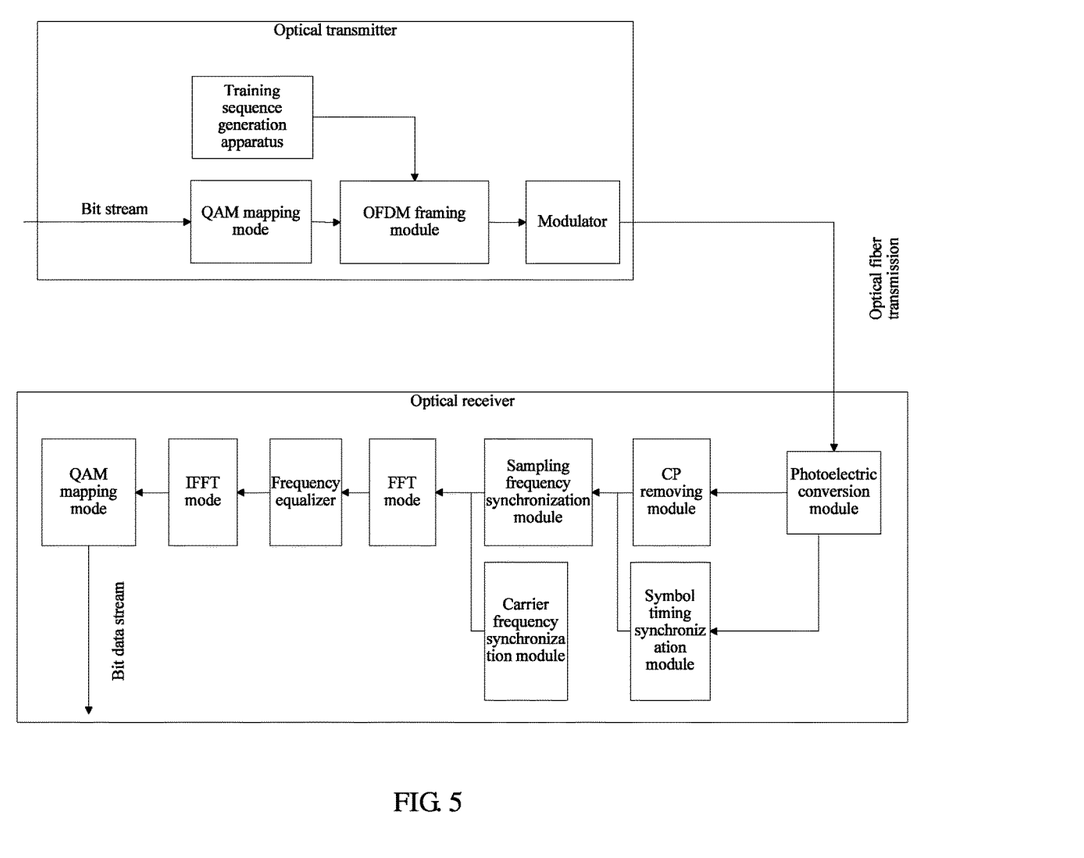
FIG. 5 is a schematic structural diagram of a single-carrier frequency domain equalization system of a training sequence generated by applying the present invention according to an embodiment of the present invention.

For example, FIG. 5 is an architecture diagram of a single-carrier frequency domain equalization system to which the training sequence generated by this embodiment of the present invention is applied. As shown in FIG. 5, in the optical transmitter, after QAM mapping of a bit data stream by a quadrature amplitude modulation (QAM) module, a data stream after the training sequence output by the training sequence generation apparatus in this embodiment of the present invention is added to an OFDM framing module to form a data stream in an OFDM frame format; the data stream is then modulated by the modulator on an optical carrier for transmission over an optical fiber; in the optical receiver, an optical signal transmitted from the optical fiber is converted into an electrical signal in an optical-to-electrical conversion module, a CP removing module removes CP in the electrical signal, and symbol timing synchronization processing is performed in a symbol timing synchronization module. Furthermore, after sampling frequency synchronization processing by a sampling frequency synchronization module and carrier frequency synchronization processing by a carrier frequency synchronization module, the electrical signal undergoes frequency domain equalization processing when it successively passes a FFT module, a frequency equalizer, and an IFFT module. Finally, a QAM de-mapping is performed on the signal after the frequency domain equalization processing to restore the original bit data stream.

It should be noted that the training sequence generation apparatus 401 in this embodiment of the present invention may be integrated in the optical transmitter 402 or may be an apparatus separate from the optical transmitter 402, which is not limited herein.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments describe in detail the training sequence generation method, the training sequence generation apparatus, and the optical communications system. With respect to the implementation and applicability of the present invention, modifications and variations may be made by a person of ordinary skill in the art according to the idea of the embodiments of the present invention. Therefore, the specification shall not be construed as a limitation on the present invention.

What is claimed is:

1. A training sequence generation method applicable to an optical communications system, the method comprising:
   generating a pseudo random sequence, wherein a number of pseudo random numbers in the pseudo random sequence is equal to half a number of subcarriers comprised in one symbol in the optical communications system;
   obtaining a chirp coefficient of a modulator used in the optical communications system;
   using a negated chirp coefficient to modulate the pseudo random sequence to generate a chirped pseudo random sequence;
   constructing a training symbol segment that comprises L subcarriers in a frequency domain, wherein L is equal to half the number of subcarriers comprised in the one symbol in the optical communications system, wherein, in the training symbol segment, a signal sent over a subcarrier with an even ordinal number is a frequency domain signal of a pseudo random number with the same ordinal number in the chirped pseudo random sequence, and a signal sent over a subcarrier with an odd ordinal number is a zero-level signal;
   transforming the training symbol segment from the frequency domain to a time domain to obtain a training symbol segment in the time domain; and
   generating a training sequence based on the training symbol segment in the time domain and outputting the training sequence, wherein the time domain of the training sequence structurally comprises two same training symbols, and each of the training symbols comprises a cyclic prefix and two training symbol segments in the time domain.

2. The method according to claim 1, wherein using the negated chirp coefficient to modulate the pseudo random sequence to generate a chirped pseudo random sequence comprises:

in the time domain, using the formula $$A(t) = \sqrt{2} A_0 \exp\left[-\frac{1+iC}{2}\left(\frac{t}{T_0}\right)^2\right]$$

to modulate an amplitude of the pseudo random number in the pseudo random sequence to generate the chirped pseudo random sequence, wherein 0≤t≤T, T is a change cycle of the pseudo random number, $A_0$ is the original amplitude of the pseudo random number, A(t) is the amplitude of the pseudo random number at time t after amplitude modulation, i is an imaginary unit, C is the negated chirp coefficient, and T0 is a half-amplitude duration when A(t) is 1/e times the value of $A_0$, wherein e is a natural base.

3. The method according to claim 2, wherein the frequency domain, before sending the chirped pseudo random sequence over the subcarrier with the even ordinal number in the training symbol segment and sending the zero-level signal over the subcarrier with the odd ordinal number in the training symbol segment, the method comprises transforming the chirped pseudo random sequence from the time domain to the frequency domain.

4. The method according to claim 1, wherein generating a pseudo random sequence comprises generating the pseudo random sequence by shifting a shift register.

5. The method according to claim 1, wherein transforming the training symbol segment from the frequency domain to a time domain comprises transforming the training symbol segment from the frequency domain to the time domain by using an inverse fast Fourier transformation or an inverse discrete Fourier transform.

6. The method according to claim 1, wherein an amplitude of the signal sent over the subcarrier with the even ordinal number is $\sqrt{2}$ times an amplitude of the frequency domain signal of the pseudo random number with the same ordinal number in the chirped pseudo random sequence.

7. A training sequence generation apparatus applicable to an optical communications system, the apparatus comprising:

a processor; and
a computer-readable storage medium storing a program to be executed by the processor, the program including instructions for:
generating a pseudo random sequence, wherein a number of pseudo random numbers in the pseudo random sequence is equal to half a number of subcarriers comprised in one symbol in the optical communications system;
obtaining unit a chirp coefficient of a modulator used in the optical communications system;
using a negated chirp coefficient to modulate the pseudo random sequence to generate a chirped pseudo random sequence;
constructing a training symbol segment that comprises L subcarriers in a frequency domain, wherein L is equal to half the number of subcarriers comprised in the one symbol in the optical communications system; in the training symbol segment, a signal sent over a subcarrier with an even ordinal number is a frequency domain signal of a pseudo random number with the same ordinal number in the chirped pseudo random sequence, and a signal sent over a subcarrier with an odd ordinal number is a zero-level signal;
transforming the training symbol from the frequency domain to a time domain to obtain a training symbol segment in the time domain; and
generating a training sequence based on the training symbol segment in the time domain and output the training sequence, wherein the time domain of the training sequence structurally comprises two same training symbols, and each of the training symbols comprises a cyclic prefix and two training symbol segments in the time domain.

8. The training sequence generation apparatus according to claim 7, wherein:

wherein using the negated chirp coefficient to modulate the pseudo random sequence to generate a chirped pseudo random sequence comprises:
in the time domain, using the formula $$A(t) = \sqrt{2} A_0 \exp\left[-\frac{1+iC}{2}\left(\frac{t}{T_0}\right)^2\right]$$

to modulate an amplitude of the pseudo random number in the pseudo random sequence to generate the chirped pseudo random sequence, wherein 0≤t≤T, T is a change cycle of the pseudo random number, $A_0$ is the original amplitude of the pseudo random number, A(t) is the amplitude of the pseudo random number at time t after amplitude modulation, i is an imaginary unit, C is the negated chirp coefficient, and T0 is a half-amplitude duration when A(t) is 1/e times the value of $A_0$, wherein e is a natural base; and
wherein the frequency domain the program includes further instructions for transforming the chirped pseudo random sequence from the time domain to the frequency domain before sending the chirped pseudo random sequence over the subcarrier with the even ordinal number in the training symbol segment and sending the zero-level signal over the subcarrier with the odd ordinal number in the training symbol segment.

9. The training sequence generation apparatus according to claim 7, wherein generating a pseudo random sequence comprises generating the pseudo random sequence by shifting a shift register.

10. The training sequence generation apparatus according to claim 7, wherein the transforming comprises transforming the training symbol segment from the frequency domain to the time domain by using an inverse fast Fourier transformation or an inverse discrete Fourier transform.

11. The training sequence generation apparatus according to claim 7, wherein the constructing is further configured to increase an amplitude of the signal sent over the subcarrier with the even ordinal number to $\sqrt{2}$ times an amplitude of the frequency domain signal of the pseudo random number with the same ordinal number in the chirped pseudo random sequence.

12. An optical communications system, comprising:
a processor;
an optical transmitter; and
an optical receiver;
wherein processor is configured to generate a pseudo random sequence, wherein a number of pseudo random numbers in the pseudo random sequence is equal to half a number of subcarriers comprised in one symbol in the optical communications system, to obtain a chirp coefficient of a modulator used in the optical communications system, to use a negated chirp coefficient to modulate the pseudo random sequence to generate a chirped pseudo random sequence, to construct a training symbol segment that comprises L subcarriers in a frequency domain, wherein L is equal to half the number of subcarriers comprised in the one symbol in the optical communications system, and in the training symbol segment, a signal sent over a subcarrier with an even ordinal number is a frequency domain signal of a pseudo random number with the same ordinal number in the chirped pseudo random sequence, and a signal sent over a subcarrier with an odd number is a zero-level signal; transform the training symbol segment from the frequency domain to a time domain to obtain a training symbol segment in the time domain, and to generate a training sequence and output it based on the training symbol segment in the time domain, wherein the time domain of the training sequence structurally comprises two training symbols, and each of the training symbols comprises a cyclic prefix and two training symbol segments in the time domain;

wherein the optical transmitter is configured to insert the training sequence output by the processor before a start position of at least one symbol to be sent, so as to form a symbol frame that carries the training sequence and to send the symbol frame after transmission processing to the optical receiver; and the optical receiver is configured to perform symbol timing synchronization processing and carrier frequency synchronization processing by using the training sequence when receiving the symbol frame.

* * * * *